United States Patent [19]

Teufel et al.

[11] 3,859,363
[45] Jan. 7, 1975

[54] HALOGENATED 4-(4'-BISPHENYLYL)-BUTANOLS

[76] Inventors: Helmut Teufel, Tafelostrasse 48;
Wolfhard Engel, Mozartstrasse 13;
Ernst Seeger, Alpenstrasse 39;
Gunther Engelhardt, Schubertweg 8, all of 7950 Biberach/Riss, Germany

[22] Filed: Oct. 10, 1972

[21] Appl. No.: 295,880

[30] Foreign Application Priority Data
Oct. 15, 1971 Germany.............................. 2151311

[52] U.S. Cl........... 260/618 D, 260/254, 260/501.1, 260/515 R, 260/515 A, 260/518 R, 260/518 A, 260/519, 260/520, 260/571, 424/330, 424/343
[51] Int. Cl............................................. C07c 31/14
[58] Field of Search................................ 260/618 D

[56] References Cited
UNITED STATES PATENTS
3,801,654   4/1974   Seeger et al. ................... 260/618 R Primary Examiner—Joseph E. Evans
Assistant Examiner—D. B. Springer
Attorney, Agent, or Firm—Hammond & Littell

[57] ABSTRACT

Compounds of the formula

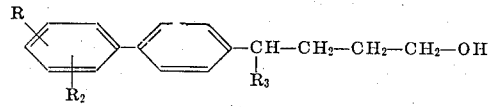

wherein $R_1$ is halogen or amino,
$R_2$ is hydrogen or halogen, and
$R_3$ is hydrogen or hydroxyl, and, when $R_1$ is amino, non-toxic, pharmacologically acceptable acid addition salts thereof; the compounds as well as the salts are useful as antiphlogistics.

2 Claims, No Drawings

HALOGENATED 4-(4'-BIPHENYLYL)-BUTANOLS

This invention relates to novel 4-(4'-biphenylyl)-butanols, as well as to various methods of preparing these compounds.

More particularly, the present invention relates to a novel class 4-(4'-biphenylyl)-butanols of the formula

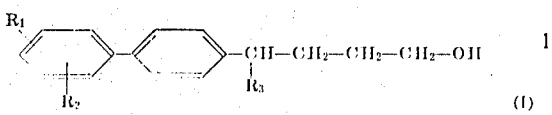

wherein $R_1$ is halogen or amino,
$R_2$ is hydrogen or halogen, and
$R_3$ is hydrogen or hydroxyl,
and, when $R_1$ is amino, non-toxic, pharmacologically acceptable acid addition salts thereof.

The novel compounds embraced by formula I may be prepared by the following methods:

Method A

For the preparation of a compound of the formula I wherein $R_3$ is hydrogen, by reducing a 4-(4'-biphenylyl)-butyric acid of the formula

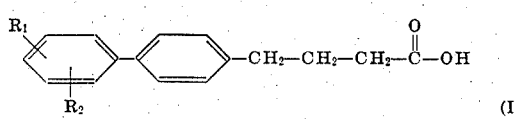

wherein $R_1$ and $R_2$ have the meanings defined in connection with formula I, with a complex hydride in the presence of an inert organic solvent medium at a temperature between room temperature and the boiling point of the particular solvent medium which is used.

Examples of suitable complex hydrides are lithium aluminum hydride, which is especially preferred, lithium borohydride, sodium bis-($\beta$-methoxy-ethoxy)-dihydroaluminate and sodium aluminum hydride.

Examples of suitable solvent media are tetrahydrofuran, ether, dioxane, dimethoxy-ethane, diethyleneglycol dimethyl ether, benzene and mixtures of any two or more of these.

Method B

For the preparation of a compound of the formula I wherein $R_3$ is hydroxyl, by reducing a 4-(4'-biphenylyl)-4-oxo-butyric acid of the formula

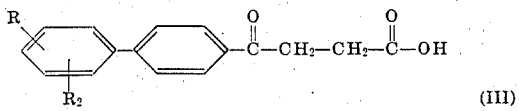

wherein $R_1$ and $R_2$ have the same meanings as in formula I, with a complex hydride, preferably lithium aluminum hydride, under the conditions described in method A.

The starting compounds of the formula II may be obtained, for instance, by catalytic hydrogenation of a 4-(4'-biphenylyl)-4-oxo-butyric acid of the formula III in a polar solvent, such as glacial acetic acid, in the presence of a strong acid, such as perchloric acid, at a temperature between 0° and 50°C. and a hydrogen pressure of 1 to 5 atmospheres with palladized barium sulfate or palladized charcoal as the catalyst (cf. also German Offenlegungsschrift 2,112,840). A 4-(4'-biphenylyl)-4-oxo-butyric acid of the formula III, in turn, may be obtained by reacting a correspondingly substituted biphenyl with succinic acid anhydride in the presence of a Lewis acid, such as anhydrous aluminum chloride, in a solvent medium, such as nitrobenzene or methylene chloride, at a temperature between 0° and 80°C. (cf. also German Offenlegungsschrift 2,112,716); in those instances where the biphenyl starting compound is an amino-substituted biphenyl, the amino-substituent must be acylated prior to the reaction with the succinic acid anhydride. After completion of the reaction, the protective acyl group may then be split off again by conventional methods.

Those compounds of the formula I wherein $R_1$ is amino are organic bases and therefore form acid addition salts with inorganic or organic acids. Examples of non-toxic, pharmacologically acceptable acid addition salts are those formed with hydrochloric acid, hydrobromic acid, sulfuric acid, acetic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

4-(2''-Fluoro-4'-biphenylyl)-1-butanol by method A 1.13 gm (0.03 mol) of lithium aluminum hydride were gradually added to a solution of 7.74 gm (0.03 mol) of 4-(2''-fluoro-4'-biphenylyl)-butyric acid (m. p. 65°–66°C.) in 100 ml of absolute tetrahydrofuran, while stirring, and the resulting mixture was refluxed for 4 hours. Thereafter, the reaction mixture was allowed to cool, was then admixed with ice water, and the resulting aqueous mixture was acidified with aqueous 50% sulfuric acid and then extracted with ether. The ethereal extract solution was washed first with aqueous sodium bicarbonate and then with water, dried and freed from solvent by evaporation. The residue was distilled in vacuo, yielding 6.3 gm (86% of theory) of a substance having a boiling point of 142°C. at 0.1 mm Hg and a melting point of 32°–34°C. after crystallization from petroleum ether. It was identified to be the compound of the formula

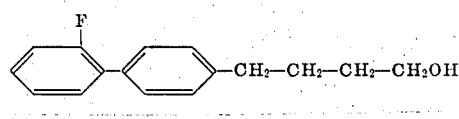

EXAMPLE 2

Using a procedure analogous to that described in Example 1, 80% of theory of 4-(4''-fluoro-4'-biphenylyl)-1-butanol, b. p. 143°–145°C. at 0.2 mm Hg, m. p. 73°C. (from cyclohexane/petroleum ether), was obtained from 4-(4''-fluoro-4'-biphenylyl)-butyric acid (m. p. 119°–120°C.) and lithium aluminum hydride.

EXAMPLE 3

4-(2''-Chloro-4'-biphenylyl)-1-butanol by method A

A solution of 25 gm (0.0912 mol) of 4-(2''-chloro-4'-biphenylyl)-butyric acid (m. p. 61°–62°C.) in 100 ml of absolute ether was added dropwise to a suspension of 3.8 gm (0.1 mol) of lithium aluminum hydride in 300 ml of absolute ether at room temperature, while stirring, and the resulting mixture was stirred at room temperature for 2 hours more. Thereafter, the excess unreacted lithium aluminum hydride was decomposed by addition of ethyl acetate, the mixture was poured into water, and the aqueous mixture was acidified with aqueous 50% sulfuric acid. The ethereal phase was separated, washed with water, dried and freed from solvent by evaporation. The residual oil was distilled in vacuo, yielding 16 gm (67.5% of theory) of the compound of the formula

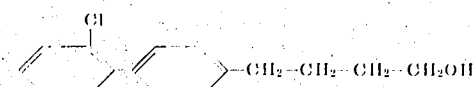

which had a boiling point of 160°C. at 0.1 mm Hg.

EXAMPLE 4

Using a procedure analogous to that described in Example 3, 69% of theory of 4-(4''-chloro-4'-biphenylyl)-1-butanol, b. p. 170°C. at 0.15 mm Hg, m. p. 97°–98°C., was obtained from 4-(4''-chloro-4'-biphenylyl)-butyric acid (m. p. 136°–137°C.) and lithium aluminum hydride with tetrahydrofuran as the solvent medium.

EXAMPLE 5

4-(2''-Amino-4'-biphenylyl)-1-butanol by method A

A solution of 8 gm (0.0313 mol) of 4-(2''-amino-4'-biphenylyl)-butyric acid in 50 ml of anhydrous ether was added dropwise to a suspension of 2.3 gm (0.062 mol) of lithium aluminum hydride in 200 ml of anhydrous ether at room temperature, while stirring, and the resulting mixture was refluxed for 3 hours. Thereafter, the reaction mixture was allowed to cool, unreacted excess lithium aluminum hydride was decomposed by addition of a little ethyl acetate, the mixture was poured into ice water, and the aqueous mixture was acidified with aqueous 50% sulfuric acid, then made alkaline with aqueous 30% sodium hydroxide and extracted three times with ether. The ethereal phases were combined, dried over sodium sulfate and freed from ether by evaporation. The oily residue was distilled in vacuo, yielding 4 gm of a distillate having a boiling point of 179°–180°C. at 0.3 mm Hg which solidified upon standing and had a melting point of 70°–72°C. after recrystallization from cyclohexane/ethyl acetate. It was identified to be the compound of the formula

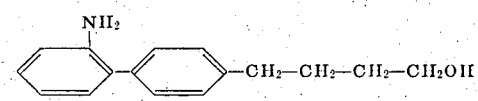

Its hydrochloride had a melting point of 205°C. (decomp.).

EXAMPLE 6

1-(2''-Fluoro-4'-biphenylyl)-1,4-butanediol by method B 20.4 gm (0.075 mol) of 4-(2''-fluoro-4'-biphenylyl)-4-oxo-butyric acid (m. p. 161°–162°C.) were gradually added to a suspension of 5.7 gm (0.15 mol) of lithium aluminum hydride in 100 ml of absolute tetrahydrofuran at room temperature, while stirring, and the resulting mixture was refluxed for 4 hours. Thereafter, the reaction mixture was allowed to cool, unreacted excess lithium aluminum hydride was decomposed by addition of a little ethyl acetate, the mixture was poured into ice water, and the aqueous mixture was acidified with aqueous 50% sulfuric acid and then extracted with ether. The ethereal phase was washed with water, dried and freed from ether by evaporation. The oily residue was distilled in vacuo, yielding 15.5 gm (79.5% of theory) of a substance having a boiling point of 196°C. at 0.1 mm Hg which, upon recrystallization from cyclohexane/ethyl acetate, had a melting point of 88°–89°C. It was identified to be the compound of the formula

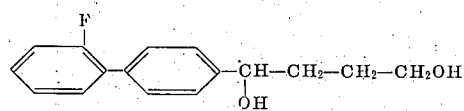

EXAMPLE 7

Using a procedure analogous to that described in Example 6, except that the reaction mixture was refluxed for only 1 hour, 78% of theory of 1-(2''-chloro-4'-biphenylyl)-1,4-butanediol, m. p. 88°–89°C. (from cyclohexane/ethyl acetate), of the formula

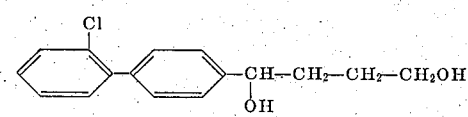

was obtained from 4-(2''-chloro-4'-biphenylyl)-4-oxo-butyric acid (m. p. 172°–174°C.) and lithium aluminum hydride.

EXAMPLE 8

Using a procedure analogous to that described in Example 6, 80% of theory of 1-(4''-chloro-4'-biphenylyl)-1,4-butanediol, m. p. 121°–122°C. (from cyclohexane/ethyl acetate), was obtained from 4-(4''-chloro-4'-biphenylyl)-4-oxo-butyric acid (m. p. 188°C.) and lithium aluminum hydride.

EXAMPLE 9

Using a procedure analogous to that described in Example 6, 58% of theory of 1-(4''-fluoro-4'-biphenylyl)-1,4-butanediol, b. p. 190°–192°C. at 0.2 mm Hg, m. p. 112°–114°C. (from diisopropyl ether), was obtained from 4-(4''-fluoro-4'-biphenylyl)-4-oxo-butyric acid (m. p. 177°–178°C.) and lithium aluminum hydride.

EXAMPLE 10

Using a procedure analogous to that described in Example 6, 60% of theory of 1-(2'',4''-dichloro-4'-biphenylyl)-1,4-butanediol, m. p. 98°C., of the formula

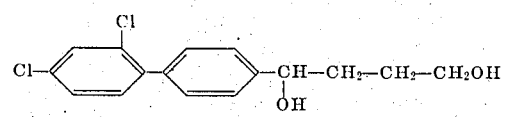

was obtained from 4-(2'',4''-dichloro-4'-biphenylyl)-4-oxo-butyric acid (m. p. 152°–153°C.) and lithium aluminum hydride.

EXAMPLE 11

1-(2'',3''-Dichloro-4'-biphenylyl)-1,4-butanediol by method B 16.2 gm (0.05 mol) of 4-(2'',3''-dichloro-4'-biphenylyl)-4-oxo-butyric acid (m. p. 174°C.) were gradually added to a suspension of 3.8 gm (0.1 mol) of lithium aluminum hydride in 250 ml of tetrahydrofuran at room temperature, while stirring, and the resulting mixture was refluxed for 1 hour. Thereafter, the reaction mixture was worked up as described in Example 6. The oily residue obtained thereby was dissolved in a small amount of ethyl acetate, the solution was heated to its boiling point, and petroleum ether was added to the boiling solution until it became turbid. Upon cooling, 13 gm (84% of theory) of a colorless crystalline substance separated out which had a melting point of 87°–89°C. It was identified to be the compound of the formula

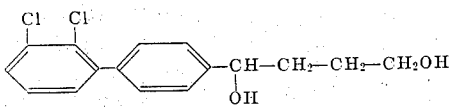

EXAMPLE 12

1-(3''-Chloro-4'-biphenylyl)-1,4-butanediol by method B 35.0 gm (0.121 mol) of 4-(3''-chloro-4'-biphenylyl)-4-oxo-butyric acid (m. p. 146°–147°C.) were gradually added to a suspension of 10.4 gm (0.274 mol) of lithium aluminum hydride in 185 ml of absolute tetrahydrofuran at room temperature, while stirring, and the resulting mixture was stirred for 4 hours at an internal temperature of 40°C. Thereafter, 10 ml of ethyl acetate were added, the mixture was again stirred for 1 hour at 40°C., and then the major amount of the tetrahydrofuran was distilled off in vacuo. The precipitate formed thereby was caused to go back into solution by the addition of 250 ml of aqueous 10% sulfuric acid, the solution was extracted several times with ether, and the combined ethereal extracts were washed successively with water, saturated aqueous sodium bicarbonate and water. The organic phase was dried over sodium sulfate, filtered, and the filtrate was evaporated in vacuo. The light brown, crystallizing residue was chromatographed on a total of 2 kg of silica gel with ethyl acetate/benzene (5:1) as the solvent. The combined eluates were evaporated, and the residue was recrystallized once from benzene and once from tetrachloromethane, each time in the presence of activated charcoal, yielding 25.0 gm (74% of theory) of the colorless crystalline compound of the formula

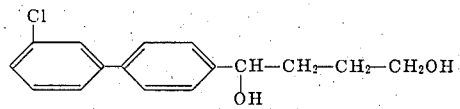

which had a melting point of 99.5°–100.5°C.

EXAMPLE 13

4-(3''-Chloro-4'-biphenylyl)-1-butanol by method A

A solution of 30.0 gm (0.109 mol) of 4-(3''-chloro-4'-biphenylyl)-butyric acid (m. p. 80°–81°C.) in 50 ml of absolute tetrahydrofuran was added dropwise to a suspension of 4.55 gm (0.120 mol) of lithium aluminum hydride in 100 ml of absolute tetrahydrofuran at room temperature, while stirring, and the mixture was stirred for 4 hours at 40°C. Thereafter, 10 ml of ethyl acetate were added dropwise, the resulting mixture was again stirred for 1 hour at 40°C., the major amount of the tetrahydrofuran was evaporated in a water aspirator vacuum, and the residue was caused to go into solution by addition of 100 ml of aqueous 10% sulfuric acid. The resulting solution was thoroughly extracted with ether, the combined ethereal extracts were successively washed with water, saturated aqueous sodium carbonate and water, dried over sodium sulfate and filtered. The filtrate was evaporated in vacuo, and the residue was distilled in vacuo, yielding 75% of theory of a colorless oil which had a boiling point of 162°–165°C. at 0.1 mm Hg and crystallized upon cooling. The crystalline product had a melting point of 23°–24°C., $n_D^{20} = 1.6031$ (subcooled melt). It was identified to be the compound of the formula

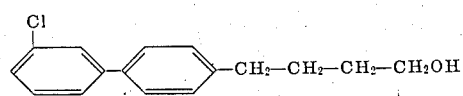

EXAMPLE 14

4-(2''-Bromo-4'-biphenylyl)-1-butanol by method A

A solution of 9.6 gm (0.03 mol) of 4-(2''-bromo-4'-biphenylyl)-butyric acid (m. p. 63°C.) in 50 ml of absolute ether was added dropwise to a suspension of 1.5 gm (0.04 mol) of lithium aluminum hydride in 150 ml of absolute ether at room temperature, while stirring, and the resulting mixture was stirred for 2 hours more at room temperature. Thereafter, 2 ml of water, then 2 ml of 2N sodium hydroxide and again 6 ml of water were added, and the precipitate formed thereby was collected by vacuum filtration. The ethereal phase of the filtrate was separated, dried, the ether was evaporated, and the oily residue was distilled in vacuo, yielding 7.5 gm (82% of theory) of a substance having a boiling point of 180°–182°C. at 0,6 mm Hg which was identified to be the compound of the formula

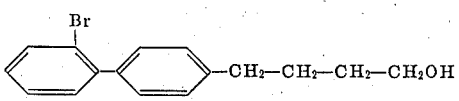

The compounds of the present invention, that is, those embraced by formula I above and, when $R_1$ is amino, non-toxic acid addition salts thereof, have useful pharmacodynamic properties. More particularly, they exhibit very effective antiphlogistic activity in warm-blooded animals, such as rats.

For example, the following representative compounds were tested for antiphlogistic activity and compatibility:

A = 4-(2''-Fluoro-4'-biphenylyl)-1-butanol
B = 1-(2''-Chloro-4'-biphenylyl)-1,4-butanediol
C = 1-(2'',3''-Dichloro-4'-biphenylyl)-1,4-butanediol
D = 1-(3''-Chloro-4'-biphenylyl)-1,4-butanediol
E = 4-(2''-Amino-4'-biphenylyl)-1-butanol The compounds were tested for their anti-exudative effects on the kaolin edema and carrageenin edema of the hind paws of the rat, for their ulcerogenicity and for their acute toxicity by oral administration to rats in comparison with phenylbutazone.

The kaolin edema was induced according to the method of Hillebrecht [Arzneimittel-Forsch. 4, 607 (1954)] by subplantary injection of 0.05 ml of a 10% suspension of kaolin in a 0.85% sodium chloride solution. The measurement of the thickness of the paws was done by using the technique of Doepfner and Cerletti (Int. Arch. Allergy. Immunol. 12, 89 (1958)).

Male FW 49-rats of an average weight of 120–150 gm were orally treated with the test compounds 30 minutes before inducement of the edema with the aid of an esophageal tube. 5 hours after the provocation of the edema the averaged values of the swelling caused in the paws of the rats treated with the test compounds were compared with those values measured on blind-treated control animals. By graphic extrapolation the dose leading to a 35% reduction of the swelling ($ED_{35}$) was calculated from the percent reduction values measured by administration of different doses.

The provocation of the carrageenin edema was effected according to the method of Winter et al. [Proc. Soc. exp. Biol. Med. 111, 544 (1962)] by subplantary injection of 0.05 ml of a 1% solution of carrageenin in a 0.85% solution of sodium chloride. The test compounds were orally administered 60 minutes before the provocation of the edema.

For the calculation of the reductive effect on the edema the values measured 3 hours after the provocation of the edema were used. All the other details were the same as described above in the case of the kaolin edema.

The tests for ulcerogenic activity were effected on FW 49-rats of both sexes (ratio 1:1) having a body weight of 130 to 150 gm. The animals were given the substances on three subsequent days, once each day, as a trituration in tylose by way of an esophageal tube.

The animals were killed 4 hours after the last administration; the stomach and duodenal mucosa were investigated for ulcers.

From the percentage of animals showing ulcers after administration of different doses, the $ED_{50}$-value was calculated according to the method of Litchfield and Wilcoxon [J. Pharmacol. exp. Therap. 96, 99 (1949)].

After oral administration to male and female FW 49-rats (ratio 1:1) having an average body weight of 135 gm, the acute toxicity ($LD_{50}$) was determined. The substances were administered orally as a trituration in tylose.

The calculation of the $LD_{50}$-values was effected, as far as possible, according to the method of Litchfield and Wilcoxon, based on the percentage of animals which died within 14 days after administration of the different doses.

The therapeutic indices, as a measure for the therapeutic usefulness, were calculated by forming the quotient of the $ED_{50}$-value for the ulcerogenicity or of the $LD_{50}$-value and the $ED_{35}$-value derived from the tests for anti-exudative activity against the kaolin and carrageenin edema.

The above-mentioned compounds surpass the known compound, phenylbutazone, in their antiphlogistic activity (see Table I). In comparison with phenylbutazone they possess a lower toxicity and exert a less impairing effect on the mucosa of the stomach.

The resulting substantially more favorable therapeutic indices (see Table II) point to a significantly better therapeutic usefulness as compared with phenylbutazone, which is known to be compatible with the stomach only on a very limited scale.

TABLE I

| Compound | kaolin edema $ED_{35}$ per os mgm/kg | carrageenin edema $ED_{35}$ per os mgm/kg | acute toxicity in the rat $LD_{50}$ per os | | ulcerogenicity in the rat $ED_{50}$ per os | |
|---|---|---|---|---|---|---|
| | | | mgm/kg | confidence limits (95% probability) | mgm/kg | confidence limits (95% probability) |
| Phenylbutazone | 58 | 69 | 864 | 793–942 | 106 | 82–138 |
| A | 22 | 16.5 | 1120 | 889–1411 | 96 | 74–125 |
| B | 54 | 60 | 2100 | 1992–2331 | 200 | 143–280 |
| C | 31 | 56 | 2840 | 2309–3493 | >400* | |
| D | 50 | 46 | 1680 | 1235–2285 | 165 | 111–246 |
| E | 27 | 33 | 800 | 661–880 | 74 | 64–85 |

*After 200 mgm/kg, 3 out of 20 animals had ulcers; after 400 mgm/kg, 6 out of 20 animals had ulcers.

TABLE II

| Compound | antiexudative effect $ED_{35}$ mgm/kg[-¹] | acute toxicity $LD_{50}$ mgm/kg | ulcerogenic effect $ED_{50}$ mgm/kg | therapeutic index | |
|---|---|---|---|---|---|
| | | | | ratio of toxic and antiexudative effect $LD_{50}/ED_{35}$ | ratio of ulcerogenic and antiexudative effect $ED_{50}/ED_{35}$ |
| Phenylbutazone | 63.5 | 864 | 106 | 13.6 | 1.7 |
| A | 19.3 | 1120 | 96 | 58.0 | 5.0 |
| B | 57 | 2100 | 200 | 36.8 | 3.5 |
| C | 43.5 | 2840 | >400 | 65.3 | >9.2 |
| D | 48 | 1680 | 165 | 35.0 | 3.4 |
| E | 30 | 800 | 74 | 26.7 | 2.5 |

[-¹] arithmetically averaged value from $ED_{35}$ for kaolin edema and $ED_{35}$ for carrageenin edema For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective anti-phlogistic dosage unit of the compounds according to the present invention is from 0.83 to 6.67 mgm/kg body weight, preferably 1.33 to 5.0 mgm/kg body weight. The daily dose rate is from 1.66 to 16.7 mgm/kg body weight, preferably 2.5 to 10 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 15

Tablets

The tablet composition is compounded from the following ingredients:

| | | |
|---|---:|---|
| 4-(2''-Fluoro-4'-biphenylyl)-1-butanol | 200.0 | parts |
| Corn starch | 97.0 | do. |
| Polyvinylpyrrolidone | 10.0 | do. |
| Magnesium stearate | 3.0 | do. |
| Total | 310.0 | parts |

Preparation

The butanol compound and the corn starch are intimately admixed with each other, the mixture is granulated with an aqueous 14% solution of the polyvinylpyrrolidone through a 1.5 mm-mesh screen, the granulate is dried at 45°C. and again passed through the screen, the dry granulate is admixed with the magnesium stearate, and the composition is compressed into 310 mgm-tablets in a conventional tablet making machine. Each tablet contains 200 mgm of the butanol compound and is an oral dosage unit composition with effective antiphlogistic action.

EXAMPLE 16

Coated Pills

The pill core composition is compounded from the following ingredients:

| | | |
|---|---:|---|
| 4-(2''-Fluoro-4'-biphenylyl)-1-butanol | 200.0 | parts |
| Corn starch | 70.0 | do. |
| Gelatin | 8.0 | do. |
| Talcum | 18.0 | do. |
| Magnesium stearate | 4.0 | do. |
| Total | 300.0 | parts |

Preparation

The butanol compound and the corn starch are intimately admixed with each other, the mixture is granulated with an aqueous 10% solution of the gelatin through a 1.5 mm-mesh screen, the granulate is dried at 45°C. and again passed through the screen, the dry granulate is admixed with the talcum and the magnesium stearate, and the composition is compressed into 300 mgm-pill cores which are subsequently coated with a thin shell consisting essentially of a mixture of sugar and talcum and finally polished with beeswax. Each coated pill contains 200 mgm of the butanol compound and is an oral dosage unit composition with effective anti-phlogistic action.

EXAMPLE 17

Gelatin Capsules

The capsule filler composition is compounded from the following ingredients:

| | | |
|---|---:|---|
| 1-(2''-Fluoro-4'-biphenylyl)-1,4-butanediol | 200.0 | parts |
| Corn starch | 190.0 | do. |
| Colloidal silicic acid | 6.0 | do. |
| Magnesium stearate | 4.0 | do. |
| Total | 400.0 | parts |

Preparation

The ingredients are intimately admixed with each other, and 400 mgm-portions of the mixture are filled into No. 1 gelatin capsules. Each capsule contains 200 mgm of the butanediol compound and is an oral dosage unit composition with effective antiphlogistic action.

EXAMPLE 18

Suppositories

The suppository composition is compounded from the following ingredients:

| | | |
|---|---:|---|
| 1-(2''-Fluoro-4'-biphenylyl)-1,4-butanediol | 300.0 | parts |
| Suppository base (e.g. cocoa butter) | 1450.0 | do. |
| Total | 1750.0 | parts |

Preparation

The finely pulverized butanediol compound is blended with the aid of an immersion homogenizer into the suppository base which had previously been melted and cooled to 40°C. 1750 mgm-portions of the compositions are poured into cooled suppository molds and allowed to harden therein. Each suppository contains 300 mgm of the butanediol compound and is a rectal dosage unit composition with effective antiphlogistic action.

EXAMPLE 19

Suspension

The suspension is compounded from the following ingredients:

| | | | |
|---|---|---:|---|
| 1-(2''-Fluoro-4'-biphenylyl)-1,4-butanediol | | 4.0 | parts |
| Dioctyl sodium sulfosuccinate (DONSS) | | 0.02 | do. |
| Benzoic acid | | 0.1 | do. |
| Sodium cyclamate | | 0.2 | do. |
| Colloidal silicic acid | | 1.0 | do. |
| Polyvinylpyrrolidone | | 0.1 | do. |
| Glycerin | | 25.0 | do. |
| Flavoring | | 0.1 | do. |
| Distilled water | q.s. ad | 100.0 | parts by vol. |

Preparation

The DONSS, the benzoic acid, the sodium cyclamate and the polyvinylpyrrolidone are successively dissolved in a sufficient amount of distilled water at 70°C., and the glycerin and colloidal silicic acid are added to the solution. The mixture is cooled to room temperature, the finely pulverized butanediol compound is suspended therein by means of an immersion homogenizer, the flavoring is added, and the composition is diluted with additional distilled water to the indicated volume. 5 ml of the resulting aqueous suspension contain 200 mgm of the butanediol compound and are an oral dosage unit composition with effective antiphlogistic action.

Analogous results are obtained when any one of the other compounds embraced by formula I or a non-toxic acid addition salt thereof is substituted for the particular butanol or butanediol compound in Examples 15 through 19. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

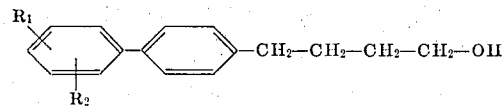

wherein $R_1$ is halogen, and
$R_2$ is hydrogen or halogen.

2. The compound of claim 1 which is 4-(2''-fluoro-4'-biphenylyl)-1-butanol.

* * * * *